United States Patent [19]

Lee

[11] Patent Number: 5,494,497
[45] Date of Patent: Feb. 27, 1996

[54] AIR CLEANER ASSEMBLY FOR VEHICLE

[75] Inventor: Kiho Lee, Seoul, Rep. of Korea

[73] Assignee: Hyundai Motor Company, Seoul, Rep. of Korea

[21] Appl. No.: 175,573

[22] Filed: Dec. 30, 1993

[30] Foreign Application Priority Data

Dec. 30, 1992 [KR] Rep. of Korea ............... 1992-27755
Dec. 30, 1992 [KR] Rep. of Korea ............... 1992-27756

[51] Int. Cl.⁶ .......................... B01D 46/10; B01D 46/52
[52] U.S. Cl. .......................... 55/480; 55/385.3; 55/481; 55/497; 55/502; 55/511; 123/198 E
[58] Field of Search ................. 55/385.3, 480, 55/481, 495, 497, 502, 504, 506, 510, 511, 521; 123/198 E

[56] References Cited

U.S. PATENT DOCUMENTS

| | | | |
|---|---|---|---|
| 3,494,113 | 2/1970 | Kinney | 55/497 X |
| 3,793,813 | 2/1974 | McAllister | 55/481 |
| 4,440,555 | 4/1984 | Chichester | 55/385.3 |
| 4,704,143 | 11/1987 | Percy | 55/481 X |
| 4,861,359 | 8/1989 | Tettman | 55/479 |
| 4,925,468 | 5/1990 | Kishi et al. | 55/481 X |
| 4,925,469 | 5/1990 | Clement et al. | 55/481 |
| 4,930,472 | 6/1990 | Ozaki | 123/198 E |
| 5,030,264 | 7/1991 | Klotz et al. | 55/481 |
| 5,039,323 | 8/1991 | Ulitsky et al. | 55/320 |
| 5,120,334 | 5/1991 | Cooper | 55/385.3 |
| 5,125,941 | 6/1992 | Ernst et al. | 55/480 |
| 5,236,478 | 8/1993 | Lewis et al. | 55/495 X |

FOREIGN PATENT DOCUMENTS

| | | |
|---|---|---|
| 554198 | 6/1943 | United Kingdom . |
| 922797 | 4/1963 | United Kingdom ........ 55/480 |
| 1255095 | 11/1971 | United Kingdom . |
| 2106634 | 4/1983 | United Kingdom . |

*Primary Examiner*—Jay H. Woo
*Assistant Examiner*—Duane S. Smith
*Attorney, Agent, or Firm*—Birch, Stewart, Kolasch & Birch

[57] ABSTRACT

The present invention provides an air cleaner assembly including an air cleaner housing includes an air inlet connected with an air duct through which atmospheric air is introduced and an air outlet connected with an intake hose for supplying the air to a combustion chamber, a filter element disposed in the air cleaner housing to filter out impurities within the air, a slot formed on the air cleaner housing to slidably mount the filter element in the air cleaner housing, and a guide rib for securely mounting the filter element which is inserted into the slot.

5 Claims, 4 Drawing Sheets

AIR CLEANER ASSEMBLY FOR VEHICLE

BACKGROUND OF THE INVENTION

1. Field of the Invention

The present invention relates to an air cleaner mounted on an intake system of a vehicle.

2. Description of Related Art

Generally, an air cleaner mounted on an intake system of a vehicle has a function of eliminating dust in air flowing into a combustion chamber thereby minimizing abrasion of a cylinder.

A dust filtering efficiency of the air cleaner is determined by an element having a pore size 40–100 μ.

The dust filtering efficiency of the element should be above 99% to be used as the air cleaner for the vehicle. In this case, since an intake resistance occurs, an intake sectional area is designed to reduced to decrease the air intake resistance.

Since the element is designed to interrupt the dust in air not to be introduced in the combustion chamber, the dust is collected at an air intake side.

Accordingly, if a volume of the collected dust increases, the air can not be sufficiently supplied into the combustion chamber since intake resistance is generated.

In this case, since the element should be replaced, the air cleaner assembly is designed such that the element can be replaced by a new element.

FIG. 4 is an exploded perspective view of a conventional air cleaner assembly, in which the assembly includes an air cleaner body fixed to a car body by bolts and an air cleaner cover 4 removably connected with an upper part of the air cleaner body 2 by bolts.

An element 6 is disposed at the inner side of each air cleaner body 2 and the air cleaner cover 4.

The air cleaner body 2 is provided with an air duct on its lower part so that the air flowing into the air cleaner body passes through the element 6. The air passing through the element 6 is designed to flow into a surge tank (not shown) through an intake hose connected to the air cleaner cover 4.

Both ends of the intake hose are connected to the surge tank and the air cleaner cover 4 by clamps 12, respectively.

In the conventional air cleaner assembly as described above, the air cleaner body 2 and the air cleaner cover 4 should be disassembled by disengaging the bolts to replace or clean up the element, and the intake hose 10 should be separated to separate the air cleaner cover 4 and the air cleaner body 2 by disengaging the clamps 12.

Accordingly, it takes much time to replace the element and the number of component parts is great because of the bolts to connect the air cleaner cover and the air cleaner body and a boss for engaging the bolts.

Further, U.S. Pat. Nos. 4,861,359, 4,930,472 5,039,323 and 5,120,334 disclose the air cleaner for an internal combustion engine.

All of the patents have a structure that the air cleaner and the air cleaner cover are separated from each other, and thus they should be separated to replace or clean the element.

SUMMARY OF THE INVENTION

It is an object of the present invention to provide an air cleaner assembly which can reduce the number of component part and easily replace an air cleaning element.

To achieve the object, the present invention provides an air cleaner assembly comprising: an air cleaner housing includes an air inlet connected with an air duct through which an atmospheric air is introduced and an air outlet connected with an intake hose for supplying the air to a combustion chamber; a filter element disposed in the air cleaner housing to filter supplying the air to a combustion chamber; a filter an impurity within the air; a slot formed on the air cleaner housing to slidably mount the filter element in the air cleaner housing; and a guide rib for securely mounting the filter element which is inserted into the slot.

The filter element is disposed to be at a right angle with respect to an air-flowing direction.

The filter element is alternatively disposed to be at an incline with respect to an air flowing direction.

The air cleaner housing is separated into a dirt air area and a purge air area on the basis of the filter assembly and a lower part of the dirt air area is larger than an upper part of the dirt air area.

The filter element has a handle on its upper side,

A rubber piece is attached on an inside of the slot of the air cleaner housing.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
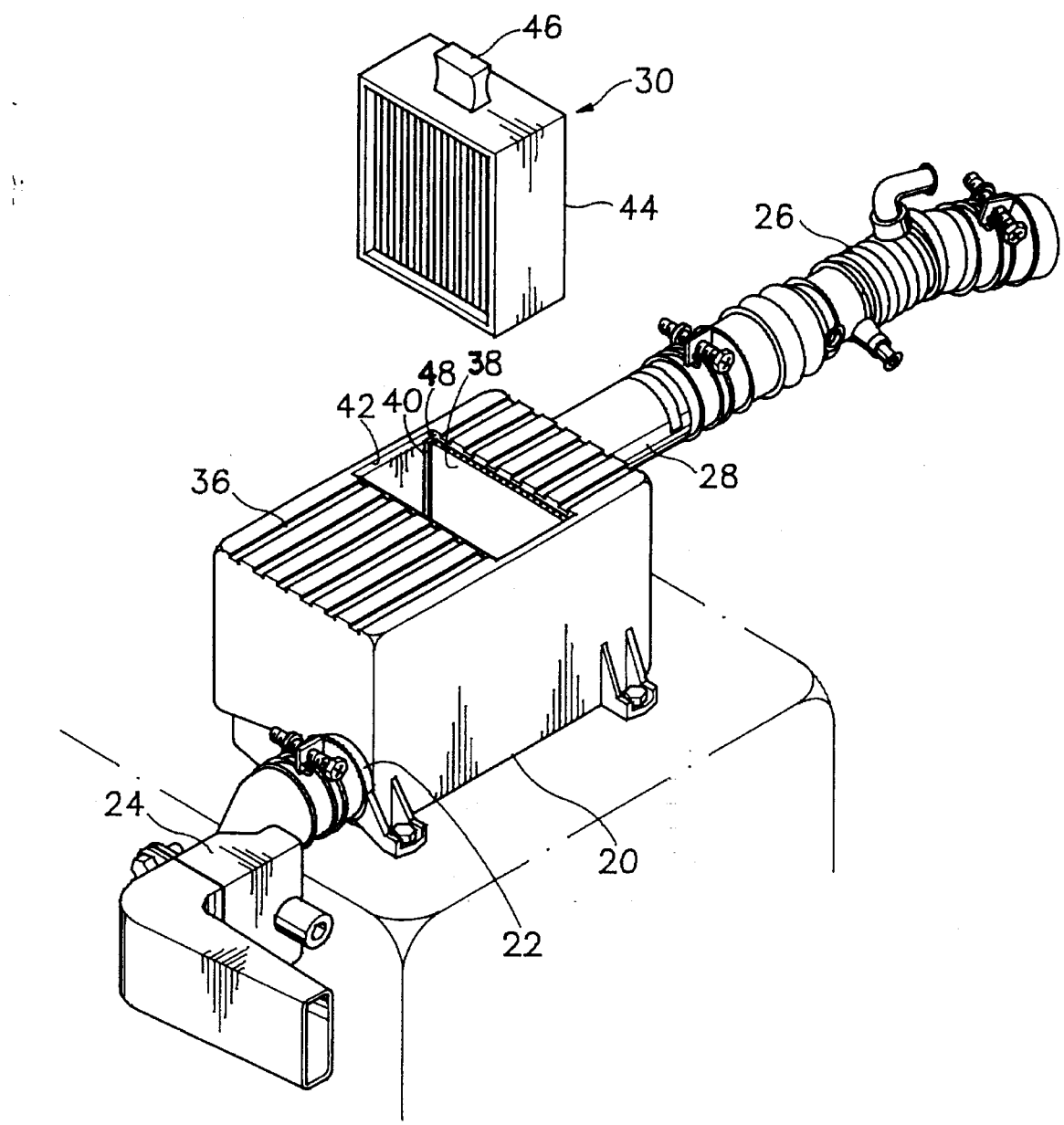
FIG. 1 is an exploded perspective view of an air cleaner assembly in accordance with a first embodiment of the present invention.
Figure 2:
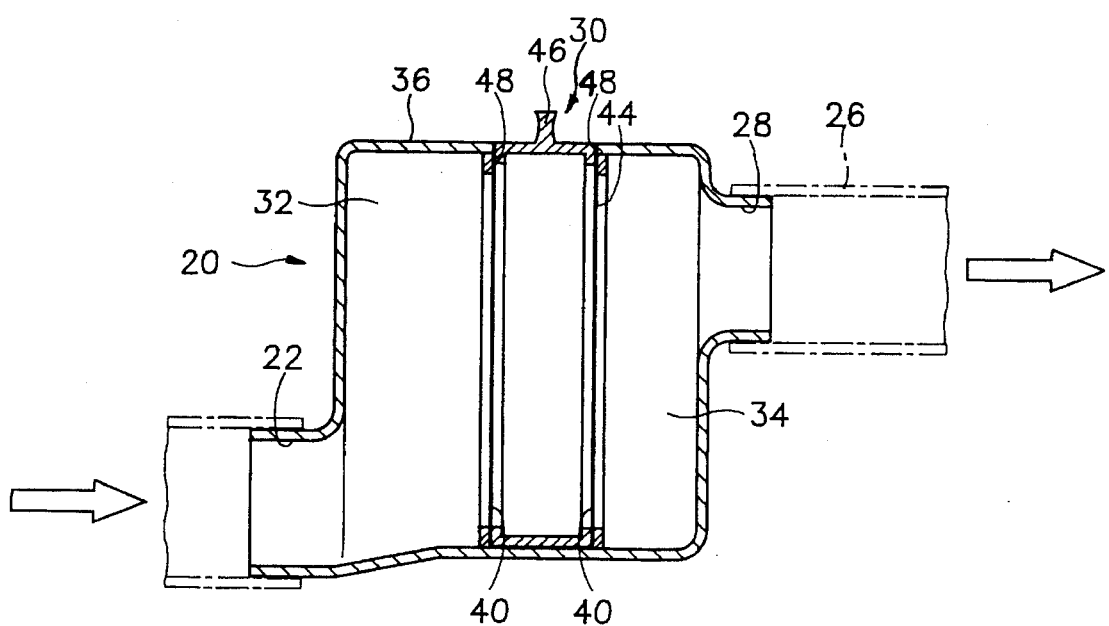
FIG. 2 is a side sectional view of an assembled air cleaner of FIG. 1.

Referring to FIGS. 1 and 2, an air cleaner housing provides upper and lower portions integrally formed with each other to have a box-shape.

The air cleaner housing 20 is provided with an air inlet 22 formed at its one side lower portion to be connected with an air duct 24 and an air outlet 28 at its other side upper portion to be connected with an intake hose 26.

The air cleaner housing is separated into a dirty air area 32 of the inlet side and a purge air area 34 of the outlet side by a filter element 30.

The filter element 30 is slidably fixed to the air cleaner housing 20. This is achieved by forming a slot 38 on an upper plate 36 of the air cleaner housing 20.

A guide rib 40 is integrally formed on an inner surface of a side plate 42 of the air cleaner housing 20 for the filter element to be easily inserted into the slot 38.

Further, an edge member 44 made of rubber is attached to the filter element 30 for the filter element 30 to smoothly slide into the slot 38.

The edge member 44 of the filter element 30 adheres closely to the slot 38 in a state that the filter element 30 is inserted into the slot 38 thereby maintaining an airtight seal and reducing a noise by preventing a sway of the air cleaner housing when the vehicle runs.

A handle 46 is formed on an upper portion of the filter element 30 so as to easily remove the filter element from the air cleaner housing 20.

Further, a rubber member 48 is attached on the slot 38 at an inner side of the upper plate 36 to prevent atmospheric air from flowing into the air cleaner housing 20 in the state that the filter element 30 is inserted into the slot 38.

In the above-described air cleaner assembly of the present invention, as shown in FIGS. 1 and 2, since the filter element 30 is disposed between the dirty air area 32 and the purge air area 34, impurities within air flowing through the air inlet 22 are filtered while the air flows into the purge air area through the filter element. The air in the purge air area flows into a combustion chamber through the air outlet 28.

By the repeated above operation, the impurities are collected on the filter element 30. In this case, if a user holds the handle 46 and pulls it, the filter element is easily removed from the cleaner housing 20.

Thereafter, the user cleans up the filter element and then inserts it into the slot 38 of the air cleaner housing 20

Figure 3:
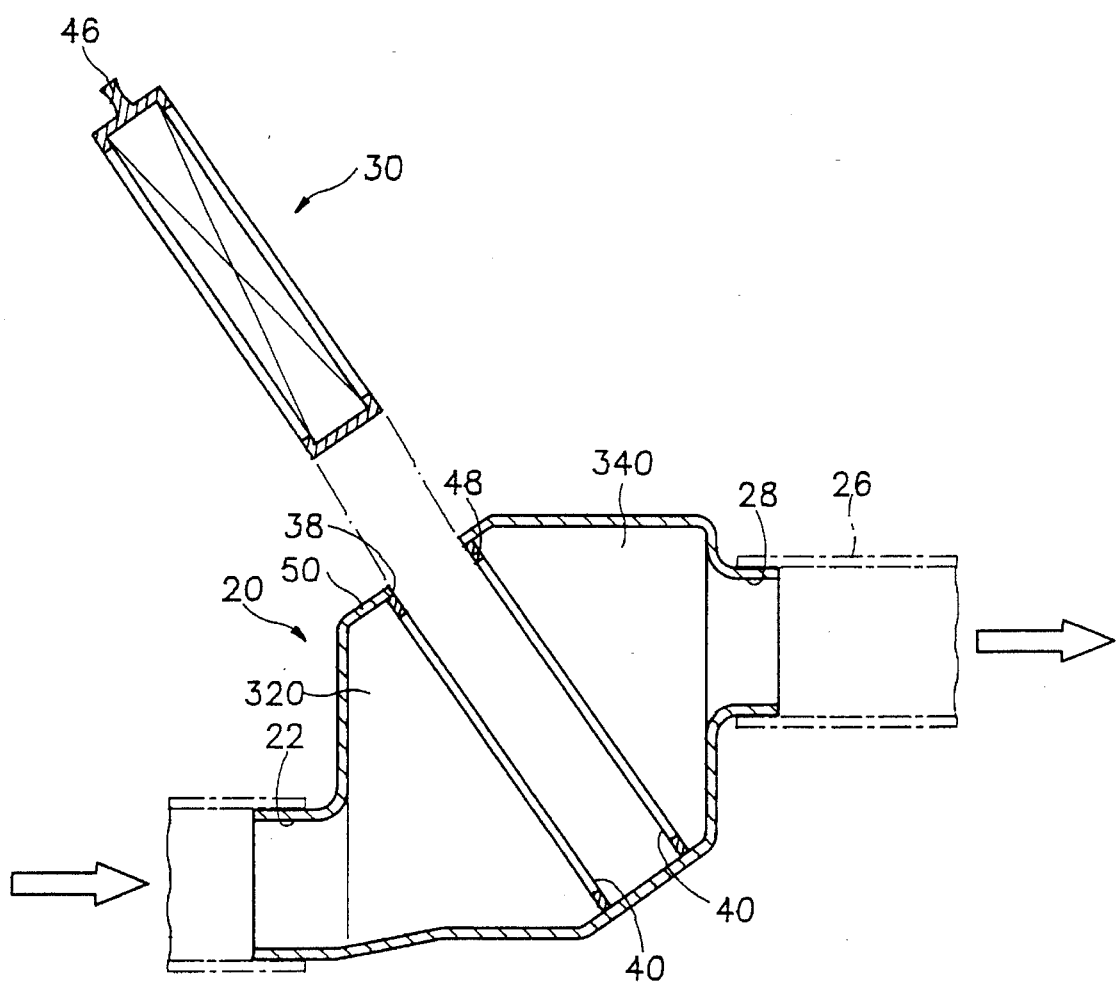
FIG. 3 is a side sectional view of an air cleaner assembly in accordance with a second embodiment of the present invention.
Figure 4:
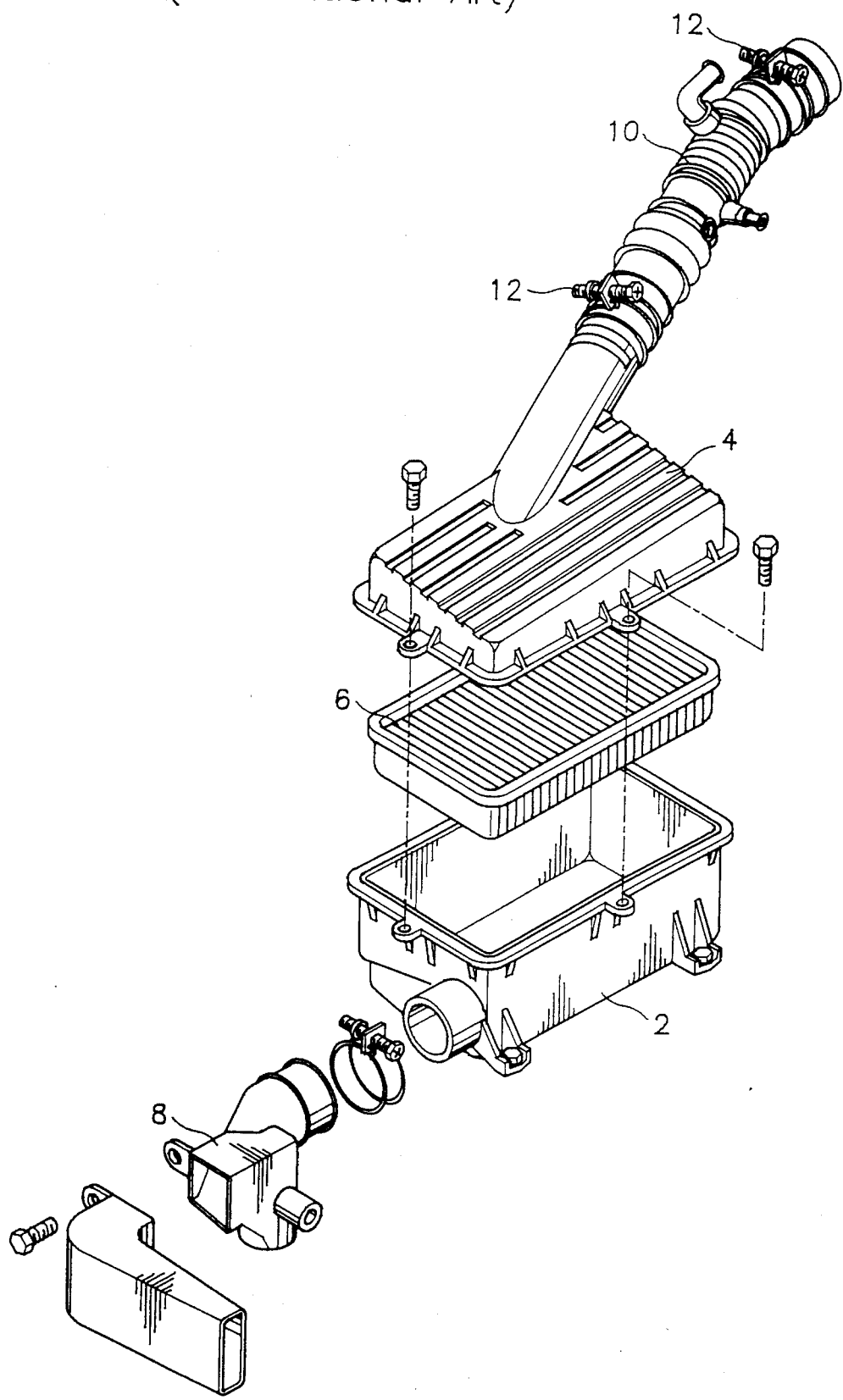
FIG. 4 is an exploded perspective view of a conventional air cleaner assembly.

FIG. 3 is a view of a second embodiment of the present invention, in which a slope is formed on an edge of the air cleaner housing. The slot 38 is formed to insert the filter element 30 thereinto.

In this embodiment, the filter element is disposed to be inclined with respect to an air-flowing direction. In this case, since the dirty air area 320 is designed to have a lower part larger than an upper part in a state that the filter element is inserted, spread of air flowing through the air inlet 22 is more effectively accomplished than that of the first embodiment.

Accordingly, the impurities are more widely collected than that of the first embodiment.

The condition of replacement of the filter can be changed in accordance with a layout of an engine room of the vehicle, and the first and second embodiment of the present invention provide an opportunity for selecting one of them.

As described above, the present invention providers an air cleaner assembly which can reduce the number of component parts and easily replace the filter element, thereby achieving operation efficiency.

What is claimed is:

1. An air cleaner assembly or a vehicle, comprising:

an air cleaner housing including at least an upper plate, opposing side plates, and an air inlet connected with an air duct at a first side of said air cleaner through which atmospheric air is introduced and an air outlet connected with an intake hose at a second side of said air cleaner for supplying the air to a combustion chamber;

a filter element of a one-piece construction including an upper and a lower end, and opposing side faces joining said ends, said filter element being disposed in the air cleaner housing to filter impurities from the air;

a rubber edge member formed circumferentially around peripheral edges of both opposing side faces of said filter element;

a slot formed in the upper plate of said air cleaner housing to slidably receive said filter element in said air cleaner housing;

a guide rib integrally formed on an inner surface of one of the opposing side plates for guiding insertion of said filter element into said slot; and a rubber sealing member attached to an inner side of the upper plate of said housing for mating with said rubber edge member formed on upper edges of the peripheral edges of said filter element, wherein the upper end of said filter element corresponds in outer dimension to said slot, such that when said filter element is slidably inserted into said slot of said housing, the outer end of said filter element sealingly joins with the upper plate of said housing at the entire outer periphery of said slot thereby covering said slot and sealing an interior of said housing from external air.

2. The assembly of claim 1, wherein said filter element is disposed at a right angle with respect to an air-flowing direction.

3. The assembly of claim 1, wherein the filter element is inclined with respect to an air-flowing direction.

4. The assembly of claim 1, wherein the air cleaner housing is separated into a dirty air area and a purged air area on the basis of the filter assembly, a lower part of the dirty air area adjacent the bottom plate being larger than an upper part of the dirty air area opposite to the bottom plate.

5. The assembly of claim 1, further comprising a handle formed on an upper side of said filter element.

* * * * *